United States Patent
Oakley

(10) Patent No.: US 9,891,069 B2
(45) Date of Patent: Feb. 13, 2018

(54) LOCATION BASED HAPTIC DIRECTION FINDING

(71) Applicant: Intel Corporation, Santa Clara, CA (US)

(72) Inventor: Nicholas W. Oakley, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/499,105

(22) Filed: Sep. 27, 2014

(65) Prior Publication Data
US 2016/0091336 A1 Mar. 31, 2016

(51) Int. Cl.
G01C 21/34 (2006.01)
G01C 21/36 (2006.01)
H04B 5/00 (2006.01)
H04B 7/26 (2006.01)
G08B 6/00 (2006.01)

(52) U.S. Cl.
CPC ....... G01C 21/3652 (2013.01); H04B 5/0031 (2013.01); H04B 7/26 (2013.01); G08B 6/00 (2013.01)

(58) Field of Classification Search
CPC .................................. G01C 21/3652
USPC ............... 340/407.1, 539.11, 539.13
See application file for complete search history.

(56) References Cited

U.S. PATENT DOCUMENTS

| | | | |
|---|---|---|---|
| 2007/0270196 A1* | 11/2007 | Wu ........................ | H04M 1/05 455/575.2 |
| 2008/0162032 A1* | 7/2008 | Wuersch ................ | G08G 1/005 701/533 |
| 2011/0316769 A1* | 12/2011 | Boettcher ............. | G06F 1/1684 345/156 |
| 2012/0116672 A1* | 5/2012 | Forutanpour .......... | G01C 21/20 701/431 |
| 2012/0218456 A1 | 8/2012 | Sweet, III et al. | |
| 2013/0187869 A1 | 7/2013 | Rydenhag et al. | |
| 2014/0340298 A1* | 11/2014 | Aldossary ............... | G06F 3/016 345/156 |
| 2015/0134249 A1* | 5/2015 | Yen ........................ | G01C 21/20 701/541 |

(Continued)

FOREIGN PATENT DOCUMENTS

| | | |
|---|---|---|
| EP | 1220179 A2 | 7/2002 |
| WO | 2007-105937 A1 | 9/2007 |
| WO | 2016/048572 A1 | 3/2016 |

OTHER PUBLICATIONS

International Search Report and Written Opinion received for International Patent Application No. PCT/US2015/047125, dated Dec. 4, 2015, 12 pages.

(Continued)

*Primary Examiner* — Brent Swarthout
(74) *Attorney, Agent, or Firm* — Alpine Technology Law Group LLC

(57) ABSTRACT

Methods and apparatus relating to location-based haptic direction finding are described. In an embodiment, logic (e.g., included in a mobile computing device) redirects one or more navigational hints to one or more trembler devices instead of a display device and/or speakers of the mobile computing device in response to a request to provide haptic directional cues. Other embodiments are also disclosed and claimed.

27 Claims, 6 Drawing Sheets

(56) References Cited

U.S. PATENT DOCUMENTS

2016/0055726 A1* 2/2016 Aldossary ............ G09B 21/003
340/407.1

OTHER PUBLICATIONS

Inntemational Preliminary Report on Patentability received for International Application No. PCT/US2015/047125, dated Apr. 6, 2017.

* cited by examiner

LOCATION BASED HAPTIC DIRECTION FINDING

FIELD

The present disclosure generally relates to the field of electronics. More particularly, an embodiment relates to techniques for location based haptic direction finding.

BACKGROUND

Portable computing devices are gaining popularity, in part, because of their decreasing prices and increasing performance. Another reason for their increasing popularity may be due to the fact that some portable computing devices may be operated at many locations, e.g., by relying on battery power. However, as more functionality and features are integrated into portable computing devices, the need to reduce power consumption becomes increasingly important, for example, to maintain battery power for an extended period of time.

BRIEF DESCRIPTION OF THE DRAWINGS

The detailed description is provided with reference to the accompanying figures. In the figures, the left-most digit(s) of a reference number identifies the figure in which the reference number first appears. The use of the same reference numbers in different figures indicates similar or identical items.

DETAILED DESCRIPTION

Figure 1:
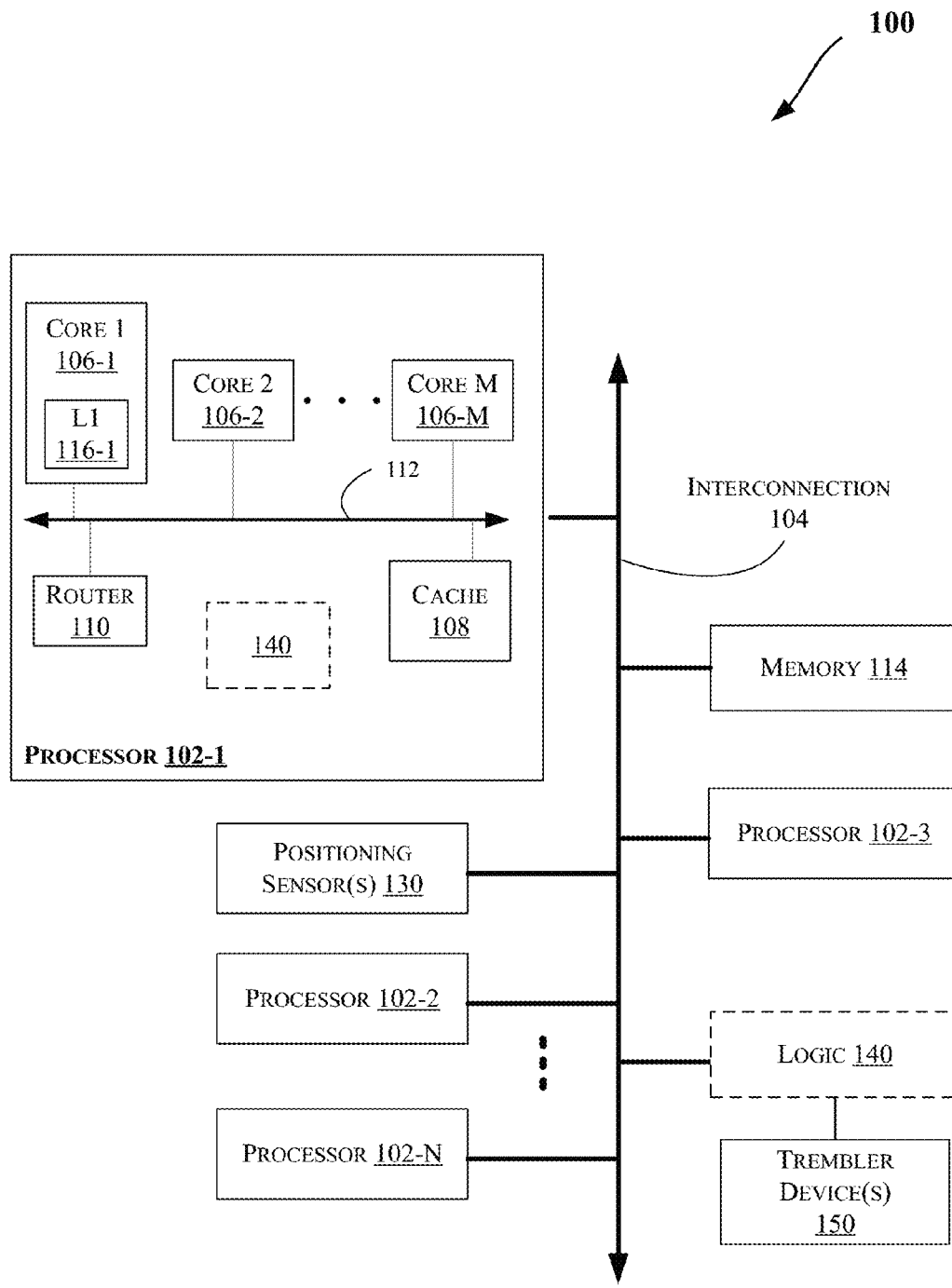
FIGS. 1 and 4-5 illustrate block diagrams of embodiments of computing systems, which may be utilized to implement various embodiments discussed herein.

In the following description, numerous specific details are set forth in order to provide a thorough understanding of various embodiments. However, various embodiments may be practiced without the specific details. In other instances, well-known methods, procedures, components, and circuits have not been described in detail so as not to obscure the particular embodiments. Further, various aspects of embodiments may be performed using various means, such as integrated semiconductor circuits ("hardware"), computer-readable instructions organized into one or more programs ("software"), or some combination of hardware and software. For the purposes of this disclosure reference to "logic" shall mean either hardware, software, firmware, or some combination thereof.

Some mobile computing devices (such as smartphones, tablets, etc.) rely on sensor data to enhance user experience for a range of applications. One such application is navigation (e.g., based on information provided by a GPS (Global Positioning System) sensor). However, the embodiments are not limited to GPS based implementations and might also respond location based services, such as at thresholds to stores, Cue "tap to pay" at entries, "Boarding now". etc.

Navigation applications generally rely on a display device to indicate where the device is located on a map and any other information such as directional arrows, etc. However, the display in a mobile device can be a significant power consumer. Also, requiring that users observe information on a display for navigational guidance may be distracting, e.g., causing a user to walk into a hazardous situation (and not even applicable in case of a user with visual disability). Further, navigational guidance via audio cues may not always work depending on a user's hearing ability, surrounding noise, etc.

To this end, some embodiments provide techniques for location based haptic direction finding. An embodiment addresses the problems associated with pedestrian turn-by-turn navigation without access to audio and/or visual cues, e.g., delivered by conventional GPS modalities. Such solutions are not limited to pedestrian navigation and may also be used by any user having access to a mobile device, such as a driver, bicycle rider, motorcycle rider, etc. Moreover, such techniques are envisioned to provide a new usage model (e.g., providing navigation cues without using audio and/or visual hints), energy efficiency (since audio and/or video cues are not required and the audio and/or video logic may be powered down or entered into a low power consumption state, or alternatively used for other purposes), practicality (e.g., providing navigation cues/hints even in the presence of: environmental constrains (such as audible noise and/or visual interference (such as bright sunlight)), hearing ability constraints (e.g., hearing disabilities), and/or visual ability constraints (e.g., visual disabilities)), etc.

For example, a user might navigate streets, campuses, or open space without referring to a hand-held, or head-mounted display map by being spurred via two trembler devices on the user's left and right sides: either in pockets, on wrists, ears etc. Moreover, a "turn right" might be signified by the trembler on the right side of the user vibrating, and vice-versa for left. Proximity, or hazard alerts might be indicated by frequency, or intensity of vibration, either, left right or simultaneously. Possible users might include tourists in unfamiliar cities, users in low visibility environments, the deaf and/or blind, or even animals with trained response.

Also, a single trembler device may be used in some embodiments, e.g., with the number of trembles indicating a given direction (such as one tremble to turn right, a double tremble to turn left, a triple tremble to go straight, a quadruple tremble to go back, intense vibration to stop, etc.). Hence, differing number of trembles may be used to convey different directions and/or actions to a user carrying a trembler device.

Some embodiments may be applied in computing systems that include one or more processors (e.g., with one or more processor cores), such as those discussed with reference to FIGS. 1-6, including for example mobile computing devices such as a smartphone, tablet, UMPC (Ultra-Mobile Personal Computer), laptop computer, Ultrabook™ computing device, wearable devices (such as smart watch, smart glasses, and the like), etc. More particularly, FIG. 1 illustrates a block diagram of a computing system 100, according to an embodiment. The system 100 may include one or more processors 102-1 through 102-N (generally referred to herein as "processors 102" or "processor 102"). The processors 102 may be general-purpose CPUs (Central Processing Units) and/or GPUs (Graphics Processing Units) in various embodiments. The processors 102 may communicate via an interconnection or bus 104. Each processor may include various components some of which are only discussed with reference to processor 102-1 for clarity. Accordingly, each of the remaining processors 102-2 through 102-N may include the same or similar components discussed with reference to the processor 102-1.

In an embodiment, the processor 102-1 may include one or more processor cores 106-1 through 106-M (referred to herein as "cores 106," or "core 106"), a cache 108, and/or a router 110. The processor cores 106 may be implemented on a single integrated circuit (IC) chip. Moreover, the chip may include one or more shared and/or private caches (such as cache 108), buses or interconnections (such as a bus or interconnection 112), graphics and/or memory controllers (such as those discussed with reference to FIGS. 4-6), or other components.

In one embodiment, the router 110 may be used to communicate between various components of the processor 102-1 and/or system 100. Moreover, the processor 102-1 may include more than one router 110. Furthermore, the multitude of routers 110 may be in communication to enable data routing between various components inside or outside of the processor 102-1.

The cache 108 may store data (e.g., including instructions) that are utilized by one or more components of the processor 102-1, such as the cores 106. For example, the cache 108 may locally cache data stored in a memory 114 for faster access by the components of the processor 102 (e.g., faster access by cores 106). As shown in FIG. 1, the memory 114 may communicate with the processors 102 via the interconnection 104. In an embodiment, the cache 108 (that may be shared) may be a mid-level cache (MLC), a last level cache (LLC), etc. Also, each of the cores 106 may include a level 1 (L1) cache (116-1) (generally referred to herein as "L1 cache 116") or other levels of cache such as a level 2 (L2) cache. Moreover, various components of the processor 102-1 may communicate with the cache 108 directly, through a bus (e.g., the bus 112), and/or a memory controller or hub.

As shown, system 100 may also include one or more positioning sensors 130 to facilitate navigation. Sensor(s) 130 may include any sensor capable of detecting, determining, and/or extrapolating locational data, including a GPS sensor, an accelerometer, a gyro senor, a magnetometer, a pedometer, etc. System 100 also includes trembler logic 140 to cause one or more trembler devices 150 to tremble to provide directional hits/cues to a user such as discussed here.

Figure 2:
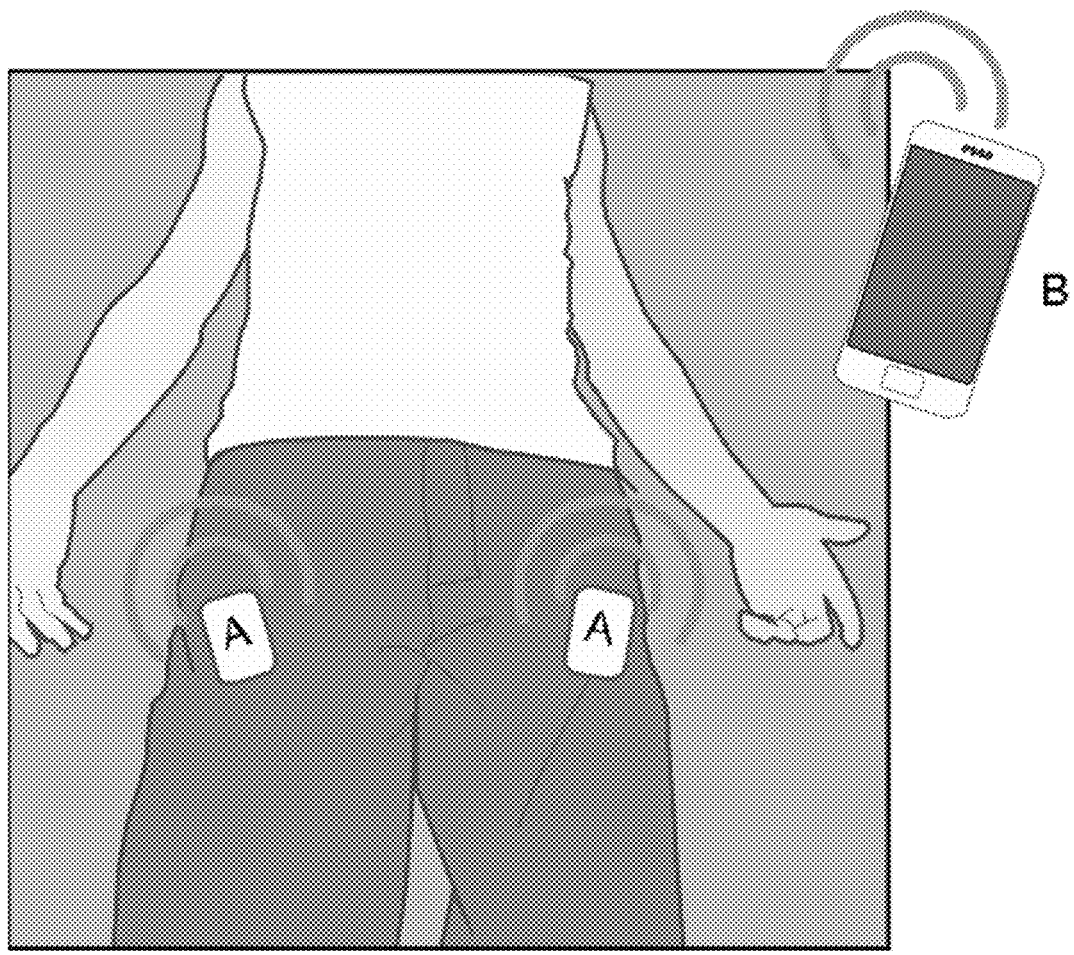
FIG. 2 illustrates a new usage model, according to an embodiment.

FIG. 2 illustrates a new usage model, according to an embodiment. As shown, two trembler devices (A, which may be the same or similar to the trembler devices 150 of FIG. 1) linked to a cellphone (B) or other mobile computing device discussed herein via wires or wirelessly (e.g., via Bluetooth™ communication, Near Field Communication (NFC), etc.) draw turn by turn data from a navigation/mapping provider (like Google Maps™ mapping service, Bing™ Maps and MapPoint™ web service, etc.) to deliver navigation haptic outputs (e.g., based on positioning data from sensors 130), allowing a user to navigate to a desired destination.

For example, a user can use their cell phone (or other mobile device, such as a smartphone, tablet, UMPC (Ultra-Mobile Personal Computer), laptop computer, Ultrabook™ computing device, wearable devices (such as smart watch, smart glasses, and the like), etc. to request directions to a specific point, so for example as they walk down a street and meet an intersection, one of the tremblers tremble depending on whether they should turn left or right. The effect is "right tremble-turn right" and vice versa. Distance might be indicated by both left and right vibrating simultaneously and rates dependent on proximity to the next turn. For the deaf, navigation request may use voice recognition, e.g., supported by the mobile device and/or from the data provider. The trembler devices might be worn in pockets, or in a more compact form, head mounted, or otherwise integrated into wearable/clothing items such as helmets, jackets, shirts, pants, shoes, glasses, etc.

Also, a single trembler device (integrated in the mobile device in an embodiment) may be used in some embodiments, e.g., with the number of trembles indicating a given direction (such as one tremble to turn right, a double tremble to turn left, a triple tremble to go straight, a quadruple tremble to go back, intense vibration to stop, etc.). Hence, differing number of trembles may be used to convey different directions and/or actions to a user carrying a trembler device.

Figure 3:
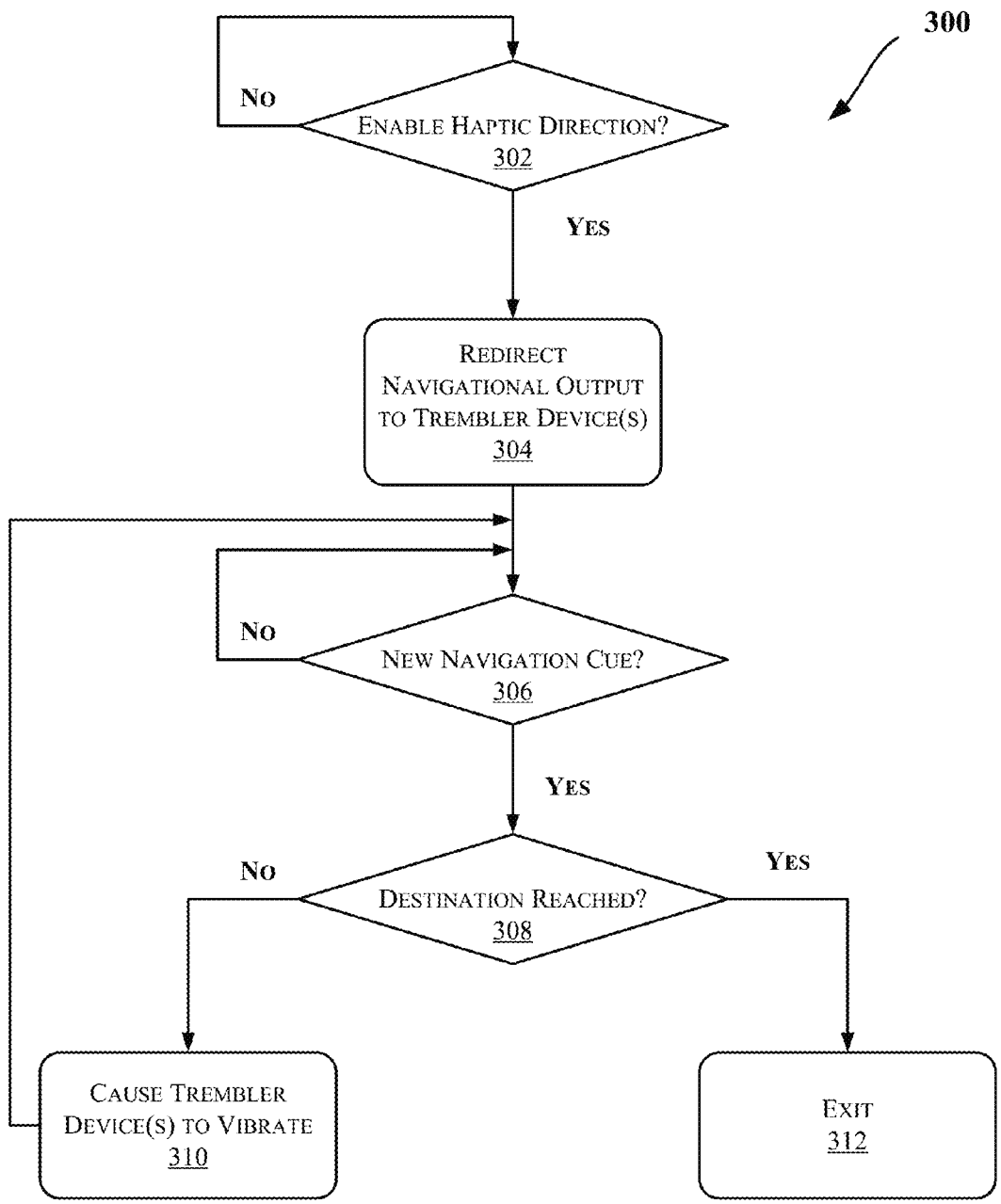
FIG. 3 illustrates a flow diagram of a method for location based haptic direction finding, according to an embodiment.

FIG. 3 illustrates a flow diagram of a method 300 for location based haptic direction finding, according to an embodiment. One or more components discussed herein (e.g., with reference to FIGS. 1-2 and 3-6) may be used to perform one or more operations discussed with reference to FIG. 3. For example, one or more operations of method 300 may be performed by logic 140 and/or trembler device(s) 150), as discussed herein.

Referring to FIGS. 1-3, at an operation 302, it is determined whether haptic direction is enabled. Operation 302 may be based on user settings. For example, a user may choose haptic direction (in lieu of visual and/or audio navigational cues) by changing a navigation application setting on user's mobile device, or a user may be provided the option for the type of directional cues each time the user requests directions to a new destination. At operation 304, the navigational output is redirected from visual and/or audio output devices (i.e., a display device and/or speakers) to logic 140 to cause trembler device(s) 150 to vibrate for directional guidance.

At operation 306, each time a new navigational cue is received (e.g., from a navigation/mapping provider (like Google Maps™ mapping service, Bing™ Maps and MapPoint™ web service, etc.) to deliver navigation haptic outputs (e.g., based on positioning data from sensors 130), operation 308 determines whether the received new cue indicates the destination is reached. If not, logic 140 causes the trembler device(s) 150 to vibrate at operation 310. Method 300 terminates once destination is reached at operation 312.

Figure 4:
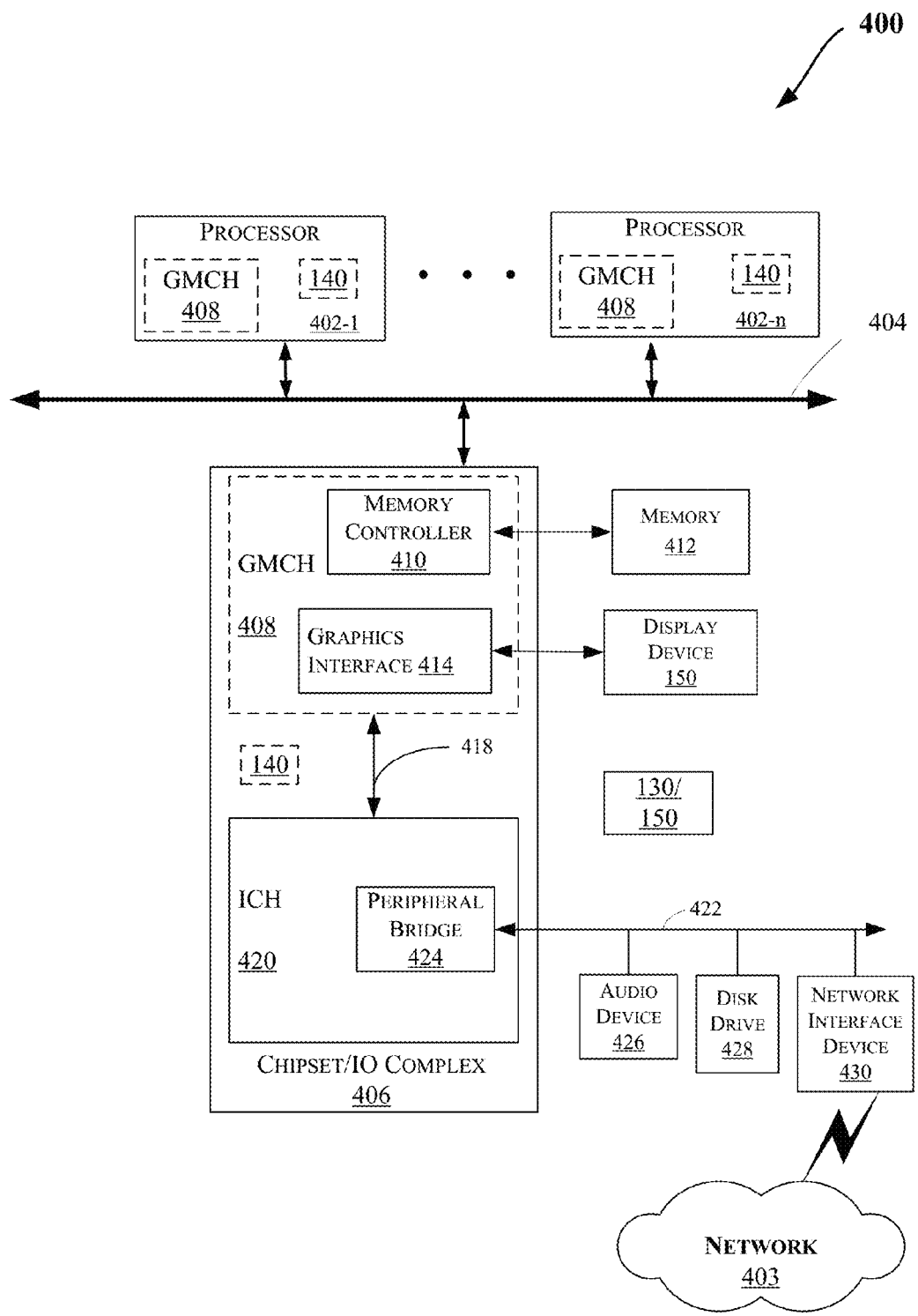

FIG. 4 illustrates a block diagram of a computing system 400 in accordance with an embodiment. The computing system 400 may include one or more Central Processing Units (CPUs) 402 or processors that communicate via an interconnection network (or bus) 404. The processors 402 may include a general purpose processor, a network processor (that processes data communicated over a computer network 403), or other types of a processor (including a reduced instruction set computer (RISC) processor or a complex instruction set computer (CISC)).

Moreover, the processors 402 may have a single or multiple core design. The processors 402 with a multiple core design may integrate different types of processor cores on the same integrated circuit (IC) die. Also, the processors 402 with a multiple core design may be implemented as symmetrical or asymmetrical multiprocessors. In an embodiment, one or more of the processors 402 may be the same or similar to the processors 102 of FIG. 1. Further, one or more components of system 400 may include logic 140 coupled to trembler device(s) 150, as well as the sensor(s) 130, discussed with reference to FIGS. 1-3 (including but not limited to those locations illustrated in FIG. 4). Also, the operations discussed with reference to FIGS. 1-3 may be performed by one or more components of the system 400.

A chipset 406 may also communicate with the interconnection network 404. The chipset 406 may include a graphics memory control hub (GMCH) 408, which may be located in various components of system 400 (such as those shown in FIG. 4). The GMCH 408 may include a memory controller 410 that communicates with a memory 412 (which may be the same or similar to the memory 114 of FIG. 1). The memory 412 may store data, including sequences of instructions, that may be executed by the CPU 402, or any other device included in the computing system 400. In one embodiment, the memory 412 may include one or more volatile storage (or memory) devices such as random access memory (RAM), dynamic RAM (DRAM), synchronous DRAM (SDRAM), static RAM (SRAM), or other types of storage devices. Nonvolatile memory may also be utilized such as a hard disk. Additional devices may communicate via the interconnection network 404, such as multiple CPUs and/or multiple system memories.

The GMCH 408 may also include a graphics interface 414 that communicates with the display device. In one embodiment, the graphics interface 414 may communicate with a display device via an accelerated graphics port (AGP) or Peripheral Component Interconnect (PCI) (or PCI express (PCIe) interface). In an embodiment, the display (such as a flat panel display) may communicate with the graphics interface 414 through, for example, a signal converter that translates a digital representation of an image stored in a storage device such as video memory or system memory into display signals that are interpreted and displayed by the display device. The display signals produced by the display device may pass through various control devices before being interpreted by and subsequently displayed on the display device.

A hub interface 418 may allow the GMCH 408 and an input/output control hub (ICH) 420 to communicate. The ICH 420 may provide an interface to I/O device(s) that communicate with the computing system 400. The ICH 420 may communicate with a bus 422 through a peripheral bridge (or controller) 424, such as a peripheral component interconnect (PCI) bridge, a universal serial bus (USB) controller, or other types of peripheral bridges or controllers. The bridge 424 may provide a data path between the CPU 402 and peripheral devices. Other types of topologies may be utilized. Also, multiple buses may communicate with the ICH 420, e.g., through multiple bridges or controllers. Moreover, other peripherals in communication with the ICH 420 may include, in various embodiments, integrated drive electronics (IDE) or small computer system interface (SCSI) hard drive(s), USB port(s), a keyboard, a mouse, parallel port(s), serial port(s), floppy disk drive(s), digital output support (e.g., digital video interface (DVI)), or other devices.

The bus 422 may communicate with an audio device 426, one or more disk drive(s) 428, and a network interface device 430 (which is in communication with the computer network 403). Other devices may communicate via the bus 422. Also, various components (such as the network interface device 430) may communicate with the GMCH 408 in some embodiments. In addition, the processor 402 and the GMCH 408 may be combined to form a single chip. Furthermore, a graphics accelerator may be included within the GMCH 408 in other embodiments.

Furthermore, the computing system 400 may include volatile and/or nonvolatile memory (or storage). For example, nonvolatile memory may include one or more of the following: read-only memory (ROM), programmable ROM (PROM), erasable PROM (EPROM), electrically EPROM (EEPROM), a disk drive (e.g., 428), a floppy disk, a compact disk ROM (CD-ROM), a digital versatile disk (DVD), flash memory, a magneto-optical disk, or other types of nonvolatile machine-readable media that are capable of storing electronic data (e.g., including instructions).

Figure 5:
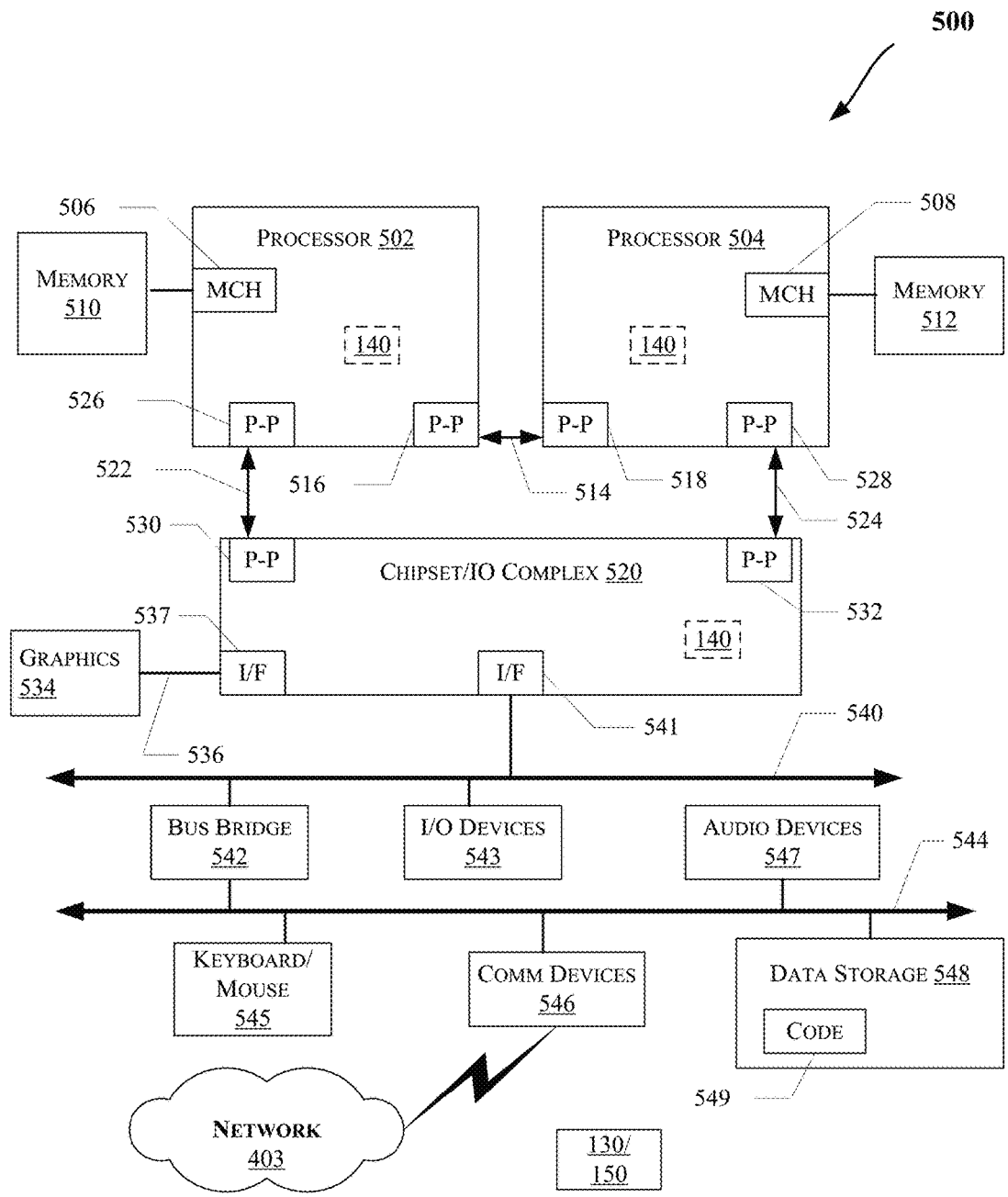

FIG. 5 illustrates a computing system 500 that is arranged in a point-to-point (PtP) configuration, according to an embodiment. In particular, FIG. 5 shows a system where processors, memory, and input/output devices are interconnected by a number of point-to-point interfaces. The operations discussed with reference to FIGS. 1-4 may be performed by one or more components of the system 500.

As illustrated in FIG. 5, the system 500 may include several processors, of which only two, processors 502 and 504 are shown for clarity. The processors 502 and 504 may each include a local memory controller hub (MCH) 506 and 508 to enable communication with memories 510 and 512. The memories 510 and/or 512 may store various data such as those discussed with reference to the memory 412 of FIG. 4.

In an embodiment, the processors 502 and 504 may be one of the processors 402 discussed with reference to FIG. 4. The processors 502 and 504 may exchange data via a point-to-point (PtP) interface 514 using PtP interface circuits 516 and 518, respectively. Also, the processors 502 and 504 may each exchange data with a chipset 520 via individual PtP interfaces 522 and 524 using point-to-point interface circuits 526, 528, 530, and 532. The chipset 520 may further exchange data with a graphics circuit 534 via a graphics interface 536, e.g., using a PtP interface circuit 537.

At least one embodiment may be provided within the processors 502 and 504. Further, one or more components of system 500 may include logic 140 coupled to trembler device(s) 150, as well as the sensor(s) 130, discussed with reference to FIGS. 1-4 (including but not limited to those locations illustrated in FIG. 5). Other embodiments, however, may exist in other circuits, logic units, or devices within the system 500 of FIG. 5. Furthermore, other embodiments may be distributed throughout several circuits, logic units, or devices illustrated in FIG. 5.

The chipset 520 may communicate with a bus 540 using a PtP interface circuit 541. The bus 540 may communicate with one or more devices, such as a bus bridge 542 and I/O devices 543. Via a bus 544, the bus bridge 542 may communicate with other devices such as a keyboard/mouse 545, communication devices 546 (such as modems, network interface devices, or other communication devices that may communicate with the computer network 403), audio I/O device 547, and/or a data storage device 548. The data storage device 548 may store code 549 that may be executed by the processors 502 and/or 504.

Figure 6:
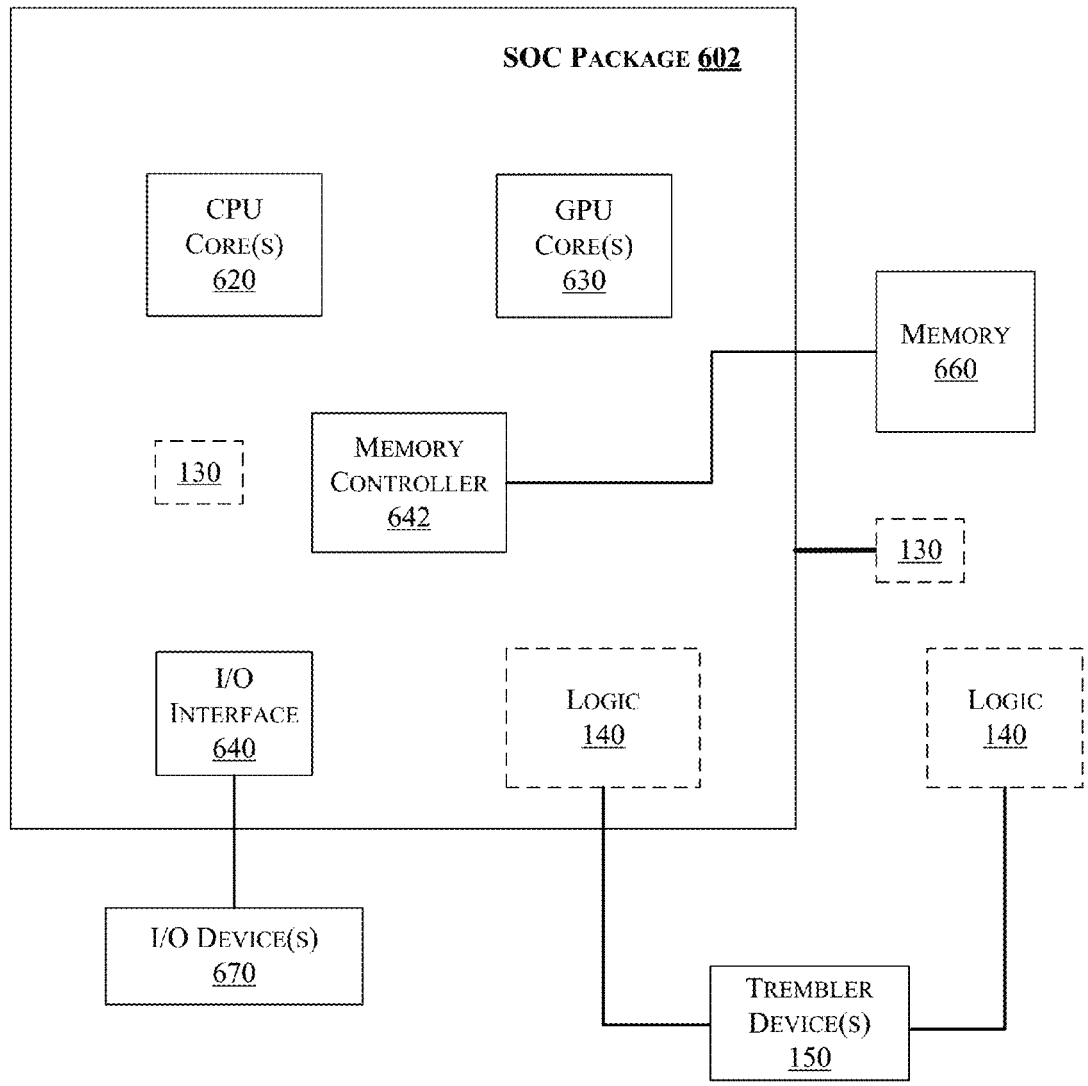
FIG. 6 illustrates a block diagram of an SOC (System On Chip) package in accordance with an embodiment.

In some embodiments, one or more of the components discussed herein can be embodied as a System On Chip (SOC) device. FIG. 6 illustrates a block diagram of an SOC package in accordance with an embodiment. As illustrated in FIG. 6, SOC 602 includes one or more Central Processing Unit (CPU) cores 620, one or more Graphics Processing Unit (GPU) cores 630, an Input/Output (I/O) interface 640, and a memory controller 642. Various components of the SOC package 602 may be coupled to an interconnect or bus such as discussed herein with reference to the other figures. Also, the SOC package 602 may include more or less components, such as those discussed herein with reference to the other figures. Further, each component of the SOC package 620 may include one or more other components, e.g., as discussed with reference to the other figures herein. In one embodiment, SOC package 602 (and its components) is provided on one or more Integrated Circuit (IC) die, e.g., which are packaged into a single semiconductor device.

As illustrated in FIG. 6, SOC package 602 is coupled to a memory 660 (which may be similar to or the same as memory discussed herein with reference to the other figures) via the memory controller 642. In an embodiment, the memory 660 (or a portion of it) can be integrated on the SOC package 602.

The I/O interface 640 may be coupled to one or more I/O devices 670, e.g., via an interconnect and/or bus such as discussed herein with reference to other figures. I/O device(s) 670 may include one or more of a keyboard, a mouse, a touchpad, a display device, an image/video capture device (such as a camera or camcorder/video recorder), a touch screen, a speaker, or the like. Furthermore, SOC package 602 may include/integrate logic 140 and/or sensor(s) 130 in some embodiments. Alternatively, logic 140 and/or sensor(s) 130 may be provided outside of the SOC package 602 (i.e., as a discrete logic).

Moreover, the scenes, images, or frames discussed herein (e.g., which may be processed by the graphics logic in various embodiments) may be captured by an image capture device (such as a digital camera (that may be embedded in another device such as a smart phone, a tablet, a laptop, a stand-alone camera, etc.) or an analog device whose captured images are subsequently converted to digital form). Moreover, the image capture device may be capable of capturing multiple frames in an embodiment. Further, one or more of the frames in the scene are designed/generated on a computer in some embodiments. Also, one or more of the frames of the scene may be presented via a display (such as the display discussed with reference to FIGS. 4 and/or 5, including for example a flat panel display device, etc.).

The following examples pertain to further embodiments. Example 1 includes 1 an apparatus comprising: logic, the logic at least partially comprising hardware logic, to redirect one or more navigational hints to one or more trembler devices instead of a display device of a mobile computing device in response to a request to provide haptic directional cues, wherein the mobile computing device is to comprise the logic. Example 2 includes the apparatus of example 1, wherein the one or more trembler devices are to communicate with the mobile device wirelessly. Example 3 includes the apparatus of example 2, wherein the wireless communication is to be provided via one or more of Bluetooth™ communication and Near Field Communication (NFC). Example 4 includes the apparatus of example 1, wherein the one or more navigational hints are to be received from a navigation or mapping provider. Example 5 includes the apparatus of example 1, wherein the logic is to cause the display device to enter a low power consumption state in response to selection of the haptic directional cues. Example 6 includes the apparatus of example 1, wherein the mobile computing device is to comprise one of: a smartphone, a tablet, a UMPC (Ultra-Mobile Personal Computer), a laptop computer, an Ultrabook™ computing device, and a wearable device. Example 7 includes the apparatus of example 6, wherein the wearable device is to include one of a smart watch, a helmet, a jacket, a shirt, a pair of pants, a pair of shorts, a shoe, or glasses. Example 8 includes the apparatus of example 1, wherein the logic is to redirect the one or more navigational hints to one or more trembler devices instead of one or more speakers in response to selection of the haptic directional cues. Example 9 includes the apparatus of example 8, wherein the logic is to cause audio logic coupled to the one or more speakers to enter a low power consumption state. Example 10 includes the apparatus of example 1, wherein a processor, having one or more processor cores, is to comprise the logic. Example 11 includes the apparatus of example 1, wherein one or more of the logic, a processor having one or more processor cores, and memory are on a single integrated circuit die.

Example 12 includes a method comprising: redirecting, at logic in a mobile computing device, one or more navigational hints to one or more trembler devices instead of a display device of the mobile computing device in response to a request to provide haptic directional cues. Example 13 includes the method of example 12, further comprising the one or more trembler devices communicating with the mobile device wirelessly. Example 14 includes the method of example 13, wherein the wireless communication is provided via one or more of Bluetooth™ communication and Near Field Communication (NFC). Example 15 includes the method of example 12, further comprising receiving the one or more navigational hints from a navigation or mapping provider. Example 16 includes the method of example 12, further comprising causing the display device to enter a low power consumption state in response to selection of the haptic directional cues. Example 17 includes the method of example 12, further comprising redirect the one or more navigational hints to one or more trembler devices instead of one or more speakers in response to selection of the haptic directional cues. Example 18 includes the method of example 17, further comprising causing audio logic coupled to the one or more speakers to enter a low power consumption state.

Example 19 includes a system comprising: a mobile computing device having memory to store data; logic to redirect one or more navigational hints to one or more trembler devices instead of a display device of the mobile computing device in response to a request to provide haptic directional cues, wherein the mobile computing device is to comprise the logic. Example 20 includes the system of example 19, wherein the one or more trembler devices are to communicate with the mobile device wirelessly. Example 21 includes the system of example 20, wherein the wireless communication is to be provided via one or more of Bluetooth™ communication and Near Field Communication (NFC). Example 22 includes the system of example 19, wherein the one or more navigational hints are to be received from a navigation or mapping provider. Example 23 includes the system of example 19, wherein the logic is to cause the display device to enter a low power consumption state in response to selection of the haptic directional cues. Example 24 includes the system of example 19, wherein the mobile computing device is to comprise one of: a smartphone, a tablet, a UMPC (Ultra-Mobile Personal Computer), a laptop computer, an Ultrabook™ computing device, and a wearable device. Example 25 includes the system of example 19, wherein the logic is to redirect the one or more navigational hints to one or more trembler devices instead of one or more speakers in response to selection of the haptic directional cues, wherein the logic is to cause audio logic coupled to the one or more speakers to enter a low power consumption state. Example 26 includes the system of example 25, wherein the logic is to cause audio logic coupled to the one or more speakers to enter a low power consumption state. Example 27 includes the system of example 19, wherein a processor, having one or more processor cores, is to comprise the logic. Example 28 includes the system of example 19, wherein one or more of the logic, a processor having one or more processor cores, and the memory are on a single integrated circuit die.

Example 29 includes an apparatus comprising means to perform a method as set forth in any preceding example. Example 30 includes machine-readable storage including machine-readable instructions, when executed, to implement a method or realize an apparatus as set forth in any preceding example.

In various embodiments, the operations discussed herein, e.g., with reference to FIGS. 1-6, may be implemented as hardware (e.g., logic circuitry), software, firmware, or combinations thereof, which may be provided as a computer program product, e.g., including a tangible (e.g., non-transitory) machine-readable or computer-readable medium having stored thereon instructions (or software procedures) used to program a computer to perform a process discussed herein. The machine-readable medium may include a storage device such as those discussed with respect to FIGS. 1-6.

Additionally, such computer-readable media may be downloaded as a computer program product, wherein the program may be transferred from a remote computer (e.g., a server) to a requesting computer (e.g., a client) by way of data signals provided in a carrier wave or other propagation medium via a communication link (e.g., a bus, a modem, or a network connection).

Reference in the specification to "one embodiment" or "an embodiment" means that a particular feature, structure, and/or characteristic described in connection with the embodiment may be included in at least an implementation. The appearances of the phrase "in one embodiment" in various places in the specification may or may not be all referring to the same embodiment.

Also, in the description and claims, the terms "coupled" and "connected," along with their derivatives, may be used. In some embodiments, "connected" may be used to indicate that two or more elements are in direct physical or electrical contact with each other. "Coupled" may mean that two or more elements are in direct physical or electrical contact. However, "coupled" may also mean that two or more elements may not be in direct contact with each other, but may still cooperate or interact with each other.

Thus, although embodiments have been described in language specific to structural features and/or methodological acts, it is to be understood that claimed subject matter may not be limited to the specific features or acts described. Rather, the specific features and acts are disclosed as sample forms of implementing the claimed subject matter.

The invention claimed is:

1. An apparatus comprising:
   logic, the logic at least partially comprising hardware logic, to redirect one or more navigational hints to one or more trembler devices instead of a display device of a mobile computing device in response to a request to provide haptic directional cues,
   wherein the mobile computing device is to comprise the logic, wherein the logic is to cause the one or more trembler devices to vibrate in response to a determination that a destination, corresponding to the one or more navigation hints, has not been reached, wherein the logic is to determine whether the destination has been reached each time a new navigation cue is received from a navigation mapping provider, wherein a differing number of trembles at a single trembler device from the one or more trembler devices is to be used to convey different directions or actions.

2. The apparatus of claim 1, wherein the one or more trembler devices are to communicate with the mobile device wirelessly.

3. The apparatus of claim 2, wherein the wireless communication is to be provided via one or more of Bluetooth™ communication and Near Field Communication (NFC).

4. The apparatus of claim 1, wherein the one or more navigational hints are to be received from a navigation or mapping provider.

5. The apparatus of claim 1, wherein the logic is to cause the display device to enter a low power consumption state in response to selection of the haptic directional cues.

6. The apparatus of claim 1, wherein the mobile computing device is to comprise one of: a smartphone, a tablet, a UMPC (Ultra-Mobile Personal Computer), a laptop computer, an Ultrabook™ computing device, and a wearable device.

7. The apparatus of claim 6, wherein the wearable device is to include one of a smart watch, a helmet, a jacket, a shirt, a pair of pants, a pair of shorts, a shoe, or glasses.

8. The apparatus of claim 1, wherein the logic is to redirect the one or more navigational hints to the one or more trembler devices instead of one or more speakers in response to selection of the haptic directional cues.

9. The apparatus of claim 8, wherein the logic is to cause audio logic coupled to the one or more speakers to enter a low power consumption state.

10. The apparatus of claim 1, wherein a processor, having one or more processor cores, is to comprise the logic.

11. The apparatus of claim 1, wherein one or more of the logic, a processor having one or more processor cores, and memory are on a single integrated circuit die.

12. A method comprising:
   redirecting, at logic in a mobile computing device, one or more navigational hints to one or more trembler devices instead of a display device of the mobile computing device in response to a request to provide haptic directional cues, wherein the logic causes the one or more trembler devices to vibrate in response to a determination that a destination has not been reached, wherein the logic determines whether the destination has been reached each time a new navigation cue is received from a navigation mapping provider, wherein a differing number of trembles at a single trembler device from the one or more trembler devices is used to convey different directions or actions.

13. The method of claim 12, further comprising the one or more trembler devices communicating with the mobile device wirelessly.

14. The method of claim 13, wherein the wireless communication is provided via one or more of Bluetooth™ communication and Near Field Communication (NFC).

15. The method of claim 12, further comprising receiving the one or more navigational hints from a navigation or mapping provider.

16. The method of claim 12, further comprising causing the display device to enter a low power consumption state in response to selection of the haptic directional cues.

17. The method of claim 12, further comprising redirect the one or more navigational hints to the one or more trembler devices instead of one or more speakers in response to selection of the haptic directional cues.

18. The method of claim 17, further comprising causing audio logic coupled to the one or more speakers to enter a low power consumption state.

19. A system comprising:
   a mobile computing device having memory to store data;
   logic to redirect one or more navigational hints to one or more trembler devices instead of a display device of the mobile computing device in response to a request to provide haptic directional cues, wherein the mobile computing device is to comprise the logic, wherein the logic is to cause the one or more trembler devices to vibrate in response to a determination that a destination, corresponding to the one or more navigation hints, has not been reached, wherein the logic is to determine whether the destination has been reached each time a new navigation cue is received from a navigation mapping provider, wherein a differing number of trembles at a single trembler device from the one or more trembler devices is to be used to convey different directions or actions.

20. The system of claim 19, wherein the one or more trembler devices are to communicate with the mobile device wirelessly.

21. The system of claim 20, wherein the wireless communication is to be provided via one or more of Bluetooth™ communication and Near Field Communication (NFC).

22. The system of claim 19, wherein the one or more navigational hints are to be received from a navigation or mapping provider.

23. The system of claim 19, wherein the logic is to cause the display device to enter a low power consumption state in response to selection of the haptic directional cues.

24. The system of claim 19, wherein the mobile computing device is to comprise one of: a smartphone, a tablet, a UMPC (Ultra-Mobile Personal Computer), a laptop computer, an Ultrabook™ computing device, and a wearable device.

25. The system of claim 19, wherein the logic is to redirect the one or more navigational hints to the one or more trembler devices instead of one or more speakers in response to selection of the haptic directional cues, wherein the logic is to cause audio logic coupled to the one or more speakers to enter a low power consumption state.

26. The apparatus of claim 1, wherein at least two trembler devices are to be provided on opposite sides of a user's body.

27. The apparatus of claim 1, wherein an intense vibration at the one or more trembler devices is to indicate that a user is to stop.

* * * * *